United States Patent
Mikkelsen et al.

(10) Patent No.: US 8,137,716 B2
(45) Date of Patent: *Mar. 20, 2012

(54) METHOD FOR PRODUCING CHEWING GUM GRANULES AND COMPRESSED GUM PRODUCTS, AND A CHEWING GUM GRANULATING SYSTEM

(75) Inventors: Rikke Mikkelsen, Vejle (DK); Kaj Hovhave Nielsen, Otterup (DK); Niels Ravn Schmidt, Barrit (DK); Per Henrik Ertebjerg Christensen, Odense (DK)

(73) Assignee: Gumlink A/S, Vejle (DK)

( * ) Notice: Subject to any disclaimer, the term of this patent is extended or adjusted under 35 U.S.C. 154(b) by 0 days.

This patent is subject to a terminal disclaimer.

(21) Appl. No.: 11/677,470

(22) Filed: Feb. 21, 2007

(65) Prior Publication Data

US 2007/0141200 A1   Jun. 21, 2007

Related U.S. Application Data

(63) Continuation of application No. 10/609,497, filed on Jul. 1, 2003, now Pat. No. 7,232,581.

(30) Foreign Application Priority Data

May 6, 2003   (EP) ..................... 03388031

(51) Int. Cl.
  *A23G 4/18* (2006.01)
(52) U.S. Cl. .............................. 426/5; 426/3
(58) Field of Classification Search ............... 426/3, 5, 426/516, 285, 454
  See application file for complete search history.

(56) References Cited

U.S. PATENT DOCUMENTS

| | | |
|---|---|---|
| 1,267,320 A | 5/1918 | Fries |
| 2,007,965 A | 7/1935 | Ellis |
| 2,290,120 A | 7/1942 | Thomas |
| 2,353,927 A | 7/1944 | Pickett |
| 2,635,964 A | 4/1953 | Hewitt et al. |
| 3,262,784 A | 7/1966 | Bucher |
| 3,440,060 A | 4/1969 | Rife et al. |
| 3,800,006 A | 3/1974 | Katayama et al. |
| 4,000,321 A | 12/1976 | Mochizuki et al. |
| 4,057,537 A | 11/1977 | Sinclair |
| 4,117,645 A | 10/1978 | Phillips |
| 4,139,589 A | 2/1979 | Beringer et al. |
| 4,161,544 A | 7/1979 | Kaul |
| 4,254,149 A | 3/1981 | Rudolph et al. |
| 4,329,369 A | 5/1982 | Tezuka et al. |
| 4,370,350 A | 1/1983 | Fisher et al. |
| 4,405,647 A | 9/1983 | Fisher et al. |
| 4,525,363 A | 6/1985 | D'Amelia et al. |
| 4,564,519 A | 1/1986 | Pellico et al. |
| 4,731,435 A | 3/1988 | Greene et al. |
| 4,737,366 A | 4/1988 | Gergely et al. |
| 4,753,805 A | 6/1988 | Cherukuri et al. |
| 4,847,090 A | 7/1989 | Della Posta et al. |
| 4,882,168 A | 11/1989 | Casey et al. |
| 4,968,511 A | 11/1990 | D'Amelia et al. |
| 4,971,806 A | 11/1990 | Cherukuri et al. |
| 5,017,385 A | 5/1991 | Wienecke |
| 5,154,927 A | 10/1992 | Song et al. |
| 5,154,939 A | 10/1992 | Broderick et al. |
| 5,161,544 A | 11/1992 | Morris |
| 5,318,784 A | 6/1994 | Ream et al. |
| 5,354,556 A | 10/1994 | Sparks et al. |
| 5,530,074 A | 6/1996 | Jarrett et al. |
| 5,536,511 A | 7/1996 | Yatka |
| 5,538,742 A | 7/1996 | McHale et al. |
| 5,545,415 A | 8/1996 | Tyrpin et al. |
| 5,569,477 A | 10/1996 | Nesbitt |
| 5,610,266 A | 3/1997 | Buchholz |
| 5,643,630 A | 7/1997 | Hinzpeter et al. |
| 5,667,824 A | 9/1997 | Ream et al. |
| 5,672,367 A | 9/1997 | Grijpma et al. |
| 5,711,961 A | 1/1998 | Reiner et al. |
| 5,753,805 A | 5/1998 | Maloney |
| 5,866,179 A | 2/1999 | Testa |
| 5,879,728 A | 3/1999 | Graff et al. |
| 5,885,631 A | 3/1999 | Kwon et al. |
| 5,942,170 A | 8/1999 | Peitz |
| 6,013,287 A | 1/2000 | Bunczek et al. |
| 6,017,565 A | 1/2000 | Rancich et al. |
| 6,153,231 A | 11/2000 | Li et al. |
| 6,190,773 B1 | 2/2001 | Imamura et al. |
| 6,194,008 B1 | 2/2001 | Li et al. |
| 6,200,608 B1 | 3/2001 | Gmunder et al. |
| 6,290,985 B2 | 9/2001 | Ream et al. |
| 6,322,806 B1 | 11/2001 | Ream et al. |
| 6,322,828 B1 | 11/2001 | Athanikar et al. |
| 6,441,126 B1 | 8/2002 | Cook et al. |
| 6,733,818 B2 | 5/2004 | Luo et al. |
| 6,932,979 B2 | 8/2005 | Gergely et al. |
| 2001/0002998 A1 | 6/2001 | Ream et al. |
| 2004/0115305 A1 | 6/2004 | Andersen et al. |
| 2004/0142066 A1 | 7/2004 | Andersen et al. |
| 2004/0146599 A1 | 7/2004 | Andersen et al. |
| 2004/0156949 A1 | 8/2004 | Andersen et al. |
| 2004/0180111 A1 | 9/2004 | Andersen et al. |
| 2005/0175733 A1 | 8/2005 | Thorengaard et al. |
| 2005/0220934 A1 | 10/2005 | Leadbeater et al. |
| 2005/0244538 A1 | 11/2005 | Andersen et al. |
| 2006/0003050 A1 | 1/2006 | Nissen |
| 2006/0039872 A1 | 2/2006 | Schmidt |

(Continued)

FOREIGN PATENT DOCUMENTS

DE   28 08 160 A1   8/1979

(Continued)

*Primary Examiner* — D. Lawrence Tarazano
*Assistant Examiner* — Nikki H Dees
(74) *Attorney, Agent, or Firm* — Sughrue Mion, PLLC

(57) ABSTRACT

The invention relates to a method for producing chewing gum granules. The method comprises at least the steps of feeding a gum composition including at least gum base into an extruder (2), pressurizing the gum composition in the extruder, extruding the gum composition through a die plate (5), and cutting the extruded gum composition in a liquid filled chamber (4). The extruded gum composition comprises at least 71% Wt. gum base and the cut granules are included in compressed gum tablets. The invention further relates to a chewing gum product, and to a chewing gum granulating system.

12 Claims, 1 Drawing Sheet

U.S. PATENT DOCUMENTS

| | | |
|---|---|---|
| 2006/0051455 A1 | 3/2006 | Andersen et al. |
| 2006/0099300 A1 | 5/2006 | Andersen et al. |
| 2006/0115433 A1 | 6/2006 | Andersen et al. |
| 2006/0121156 A1 | 6/2006 | Andersen et al. |
| 2006/0147580 A1 | 7/2006 | Nissen et al. |
| 2006/0165842 A1 | 7/2006 | Andersen et al. |
| 2006/0204451 A1 | 9/2006 | Salini |
| 2006/0240143 A1 | 10/2006 | Andersen et al. |
| 2006/0246174 A1 | 11/2006 | Andersen et al. |
| 2006/0257524 A1 | 11/2006 | Mikkelsen et al. |

FOREIGN PATENT DOCUMENTS

| | | |
|---|---|---|
| DE | 37 32 677 A1 | 4/1989 |
| DE | 197 51 330 A1 | 5/1995 |
| EP | 0 151 344 A2 | 8/1985 |
| EP | 0 221 850 A2 | 5/1987 |
| EP | 0 253 040 A2 | 1/1988 |
| EP | 0 258 780 A2 | 3/1988 |
| EP | 0 267 160 A2 | 5/1988 |
| EP | 0 370 296 A2 | 5/1990 |
| EP | 0 399 479 A1 | 11/1990 |
| EP | 0 427 185 A2 | 11/1990 |
| EP | 0 415 656 A2 | 3/1991 |
| EP | 0 437 098 A2 | 7/1991 |
| EP | 0 500 098 A2 | 8/1992 |
| EP | 0 513 978 A2 | 11/1992 |
| EP | 0 558 965 A2 | 9/1993 |
| EP | 0 711 506 A2 | 5/1996 |
| EP | 0 890 358 A1 | 1/1999 |
| EP | 1 066 759 A1 | 1/2001 |
| EP | 1 306 013 A1 | 5/2003 |
| EP | 1 354 908 A1 | 10/2003 |
| EP | 1 449 525 A1 | 8/2004 |
| EP | 1 554 935 A1 | 7/2005 |
| EP | 1 752 048 A2 | 2/2007 |
| GB | 1 484 832 | 9/1977 |
| JP | 48-19950 | 6/1973 |
| JP | 4-252143 A | 9/1992 |
| JP | 6-46760 A | 2/1994 |
| JP | 8-196214 A | 8/1996 |
| JP | 9-47226 A | 2/1997 |
| WO | 86/03967 A1 | 7/1986 |
| WO | 94/11441 A1 | 5/1994 |
| WO | 94/14331 A1 | 7/1994 |
| WO | 94/16574 A1 | 8/1994 |
| WO | 94/22323 A1 | 10/1994 |
| WO | 96/03111 A1 | 2/1996 |
| WO | 97/21424 A1 | 6/1997 |
| WO | 97/25877 A1 | 7/1997 |
| WO | 99/27798 A1 | 6/1999 |
| WO | 99/33353 A1 | 7/1999 |
| WO | 00/19837 A1 | 4/2000 |
| WO | 00/19977 A1 | 4/2000 |
| WO | 00/25598 A1 | 5/2000 |
| WO | 00/35296 A1 | 6/2000 |
| WO | 00/35297 A1 | 6/2000 |
| WO | 00/56281 A1 | 9/2000 |
| WO | 01/01788 A1 | 1/2001 |
| WO | 01/19206 A1 | 3/2001 |
| WO | 01/47368 A1 | 7/2001 |
| WO | 01/54512 A1 | 8/2001 |
| WO | 01/72139 A1 | 10/2001 |
| WO | 01/93694 A1 | 12/2001 |
| WO | 02/051258 A1 | 7/2002 |
| WO | 02/069729 A1 | 9/2002 |
| WO | 02/071860 A1 | 9/2002 |
| WO | 02/076227 A1 | 10/2002 |
| WO | 02/076228 A1 | 10/2002 |
| WO | 02/076229 A1 | 10/2002 |
| WO | 02/076230 A1 | 10/2002 |
| WO | 02/076231 A1 | 10/2002 |
| WO | 02/076232 A1 | 10/2002 |
| WO | 02/078459 A1 | 10/2002 |
| WO | 02/094032 A1 | 11/2002 |
| WO | WO 02/094033 A1 | 11/2002 |
| WO | WO 03/011045 A1 | 2/2003 |
| WO | 03/053156 A1 | 7/2003 |
| WO | 03/084338 A1 | 10/2003 |
| WO | 2004/004478 A1 | 1/2004 |
| WO | 2004/004479 A1 | 1/2004 |
| WO | 2004/004480 A1 | 1/2004 |
| WO | 2004/006686 A1 | 1/2004 |
| WO | 2004/028265 A1 | 4/2004 |
| WO | 2004/028266 A1 | 4/2004 |
| WO | 2004/028267 A1 | 4/2004 |
| WO | 2004/028268 A1 | 4/2004 |
| WO | 2004/028269 A1 | 4/2004 |
| WO | 2004/028270 A1 | 4/2004 |
| WO | 2004/068964 A1 | 8/2004 |
| WO | 2004/068965 A1 | 8/2004 |
| WO | 2004/073691 A1 | 9/2004 |
| WO | 2005/063038 A2 | 7/2005 |

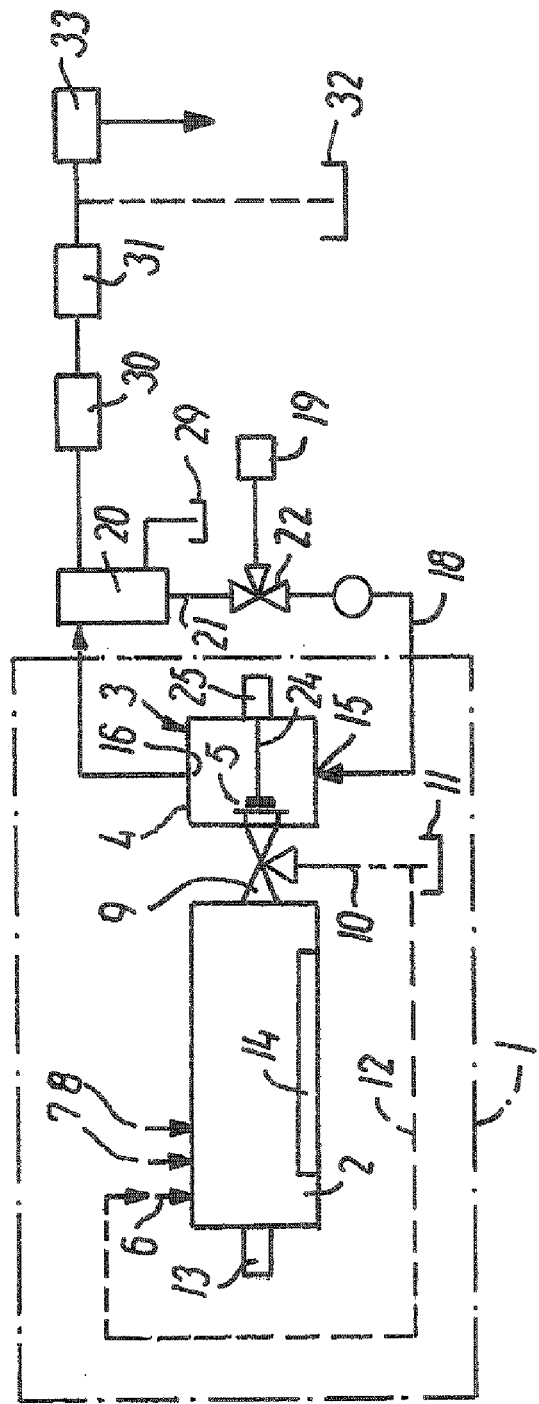
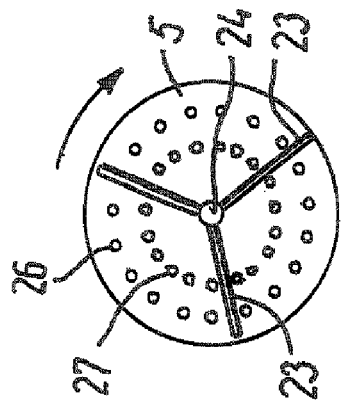
FIG. 1
FIG. 2

METHOD FOR PRODUCING CHEWING GUM GRANULES AND COMPRESSED GUM PRODUCTS, AND A CHEWING GUM GRANULATING SYSTEM

CROSS-REFERENCE TO RELATED APPLICATIONS

This is a Continuation Application of pending prior application Ser. No. 10/609,497 (confirmation no. 1689) filed Jul. 1, 2003. The present application claims the benefit of priority from European Patent Application No. 03388031.1 filed on May 6, 2003.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

The present invention relates to a method for producing chewing gum granules and compressed gum granules, which method comprises at least the steps of feeding a gum composition including at least gum base into an extruder, pressurizing the gum composition in the extruder, extruding the gum composition through a die plate, and cutting the extruded gum composition in a liquid filled chamber. The present invention further relates to a chewing gum product, and to a chewing gum granulating system.

U.S. Pat. No. 4,117,645 disclose a chewing gum base formulated as a hot viscous blend, which is extruded in an extruder though a die plate after which the extruded product is cut into pellets in a liquid that also cools the extruded product. The liquid and the formed pellets are conveyed to bulk containers for transport to further processing, i.e. dewatering and mechanical mixing with other ingredients to produce a chewing gum.

A similar process is disclosed in WO 02/094032, which describes a process and apparatus for producing gum pellets by extrusion through a die plate and cutting of pellets in a liquid-filled chamber. The ingredients comprising gum base, fillers, sweeteners, intense sweeteners and flavour are mixed beforehand to form a mixture e.g. a bubble gum mixture. The mixture is feed to an extruder and extruded and pelletized and cooled in a liquid. The liquid transports the pelletized product to a centrifugal dryer that separates the product from the liquid. The separated products are then dusted with an anti-agglomerating compound and coated or otherwise packaged for consumption.

Traditional chewing gum is manufactured by mixing a gum base with flavours, sweeteners, plasticizers and other ingredients into a homogenous, coherent mass which is cooled and shaped into gum centres. The gum centres can be coated to form the final chewing gum. Such chewing gum has a very comfortable texture and other good qualities. However, some of the active ingredients such as flavours or added pharmaceutical agents, in case of a medical chewing gum, may break down or deteriorate during the production due to heat and the mechanical mixing.

Chewing gum comprising gum granules either as free flowing granules or in compressed form, i.e. tabletted chewing gum made from gum granules, has a tendency of giving the consumer an unpleasant feeling due to separation of the individual granules or to separation of the mixture of gum composition.

SUMMARY OF THE INVENTION

An object of the present invention is to provide a method for producing granules, suitable for compressed tablets of chewing gum, having improved properties, in particular during the initial phase of chewing.

The method of the present invention is accordingly characterized in that the cut gum granules include at least gum base in the range of 71-99% wt. based on the total weight of the granules together with at least sweetener and/or flavour in the range of 0.1-29% wt. based on the total weight of the granules, that at least the extruded gum granules are conveyed to a tabletting machine, and that at least the gum granules are pressed into compressed chewing gum tablets in the tablet pressing machine.

The high content of gum base in the granules results in granules having a high tackiness during the initial chew. Although the final chewing gum is typically composed of further ingredients, such as bulk sweeteners etc., in addition to the granules, the high content of gum base in the granules act to make the various ingredients unite into a common mass during the initial chew in the mouth, instead of the prior art tendency to disintegrate. The tendency of unification during the initial chew provided by the present invention is in particular pronounced in case of compressed tablets including the gum granules.

The provision of taste agents in form of sweeteners and/or flavours within the granules cause a prolonged release of taste during mastication as compared to the prior art compressed gum tablets.

The granules produced by the method according to the present invention thus results in manufacture of chewing gum products having excellent qualities of both a pleasant initial chew with low tendency to disintegrate and an extended duration of taste.

It has been found that the content of gum base in the gum composition should be at least 71% Wt. to obtain the desired tackiness of the granules, which influences the behaviour of the granules in a compressed chewing gum product and thereby the feeling during the initial phase of chewing. It has also been found that the content of gum base should not exceed 99% Wt. if the highly desired properties with regard to prolonged taste should be obtained. Thus, it is necessary that the gum composition constituting the granules includes at least 0.1% Wt. sweetener and/or flavour as tasting agents.

Although a gum base content of 71% is considered very high for a component in a final chewing gum it is possible to obtain even higher minimum tackiness by increasing the lower limit for gum base content so that the gum granules include gum base in the range of 75-99% Wt., conveniently in the range of 86-99% Wt., preferably in the range of 91-99% Wt., based on the total weight of the granules, suitable 95.5-99% Wt. based on the total weight of the granules.

The gum composition may be pre-mixed with sweetener and/or flavour and optionally other ingredients before it is fed to the extruder. Alternatively, or additionally, sweetener and/or flavour may be mixed with the gum composition in the extruder. With regard to sweeteners for chewing gum, a distinguishing between bulk sweetener and intense sweetener (high potency sweetener) is often relevant. Bulk sweetener are well known sweeteners such as sucrose, dextrose, dextrins, maltose, trehalose, D-tagatose, dried invert sugar, ribose, fructose, levulose, galactose, glucose, maltodextrin, polydextrose, palatinit, sorbitol, sorbitol syrup, mannitol, xylitol, hexa-resorcinol, maltitol, isomalt, erythriol, lactitol, xylose, tagatose and hydrogenated starch hydrolysates (lycasin). Intense or high potent sweeteners includes the dipeptides aspartame, neotame and alitame; N-sulfonylamides such as saccharin including the salts thereof and acesulfam including the salts thereof; sulfamates such as cyclamate including the salts thereof; chlorinated sugar derivatives such as sucralose; Terpenoid glycosides such as Rebaudioside-A, Stevioside and Glyhyrrhizin; proteins such as thaumatin and monellin and Di-hydrochaleones. The gum composition to be extruded and granulated is substantially free of bulk sweetener. Bulk sweeteners are normally water soluble and may to some extent be dissolved from the gum composition granules in the liquid filled chamber.

In a preferred embodiment of the method according to the invention the gum composition in step a) is gum base. The sweetener and/or flavour can be added to the gum base in the extruder, which serves to mix the gum base with the added sweetener and/or flavour into a gum composition.

As the method according to the invention tends towards providing granules comprising a relatively high content of gum base, the addition of sweetener is kept in the range of 0.1-15% Wt., preferably in the range of 0.2-10% Wt. based on the total weight of the granules, suitably in the range 0.5-4.9% Wt., based on the total weight of the granules, suitably not exceeding 25% Wt., and in any case not exceeding 29% Wt.

Similarly, the amount of flavour is kept in the range of 0.1-15% Wt., preferably in the range of 1-10% Wt., and suitably the range of 2-5% Wt., based on the total weight of the granules, suitably not exceeding 25% Wt., and in any case not exceeding 29% Wt.

The incorporation of sweetener and/or flavour in the granules assists in providing a long-lasting taste in the chewing gum product, e.g. tablets made from compressed granules. However, if the amount of sweetener and/or flavour exceeds 29% Wt., the content of gum base becomes too low to obtain the desired tackiness.

According to a non-binding theory the size of the granules also influences the properties of the granules. Thus in order to obtain the best possible properties of the granules it is desired that the average diameter of the formed granules is in the range from 0.1 mm to 3 mm, suitably in the ranges of 0.1 to 2.8 mm and 0.2 to 2.5 mm, preferably from 0.25 to 0.9 mm. Nevertheless it is also possible to produce granules with average diameters somewhat larger than 3 mm having a high content of gum base.

Surprisingly it has proven to be advantageous to mix granules having different sizes to obtain even better properties of a compressed chewing gum product. It is believed that such mixing secures a better homogeneity of added ingredients such a sweetener and flavour to the granules. Consequently in a preferred embodiment of the method according to the invention the gum composition in step c) is extruded though die openings in a die device having openings of at least two different sizes to simultaneously obtain granules with different average diameters. Thus granules having different sizes are obtained. More than two different sizes may be obtained, depending on the design of the die device or die plate in use. It is for instance possible to obtain granules in three, four or more different sizes although two different sizes are preferred.

Consequently, in an embodiment a first fraction of the extruded granules has a first average diameter, and a second fraction of the extruded granules has a second average diameter larger than the mentioned first average diameter. More specific it is preferred that the first average diameter is in the range from 0.1 to 0.95 mm, preferably from 0.25 to 0.9 mm, suitable 0.3 to 0.5 mm, and the second average diameter is in the range from 0.6 to 1.9 mm, preferably from 0.8 to 1.4 mm, suitable in the range 0.9 to 1.3 mm. Such mixtures of granules have shown good properties with regard to avoiding segregation in a mixture of gum composition granules and optionally other ingredients like powdered sweeteners and/or flavours, e.g. before compression in a tablet pressing machine. Optional preferred ranges for granules with three different fractions of diameters may be average diameters in a first range of 0.1-0.7 mm suitably 0.2-0.6 mm, average diameters in a second range of 0.8-1.5 mm suitably 0.9-1.4 mm, and averages diameter in a third range of 1.6-2.5 mm suitably 1.7-2.4 mm.

According to the invention it is also possible to produce granules with different average diameters by making granules with one diameter at the time in the granulator, and subsequently mix the granules with different average diameters in desired proportions.

In an optional further step, external liquid is substantially removed from the extruded granules. The liquid may be removed in a centrifugal dryer or other drying devices, e.g. a fluid bed dryer, suitable for removing liquid from solids. When the liquid has been removed from the slurry of liquid and granules, the content of liquid within the granules can e.g. be below 3% Wt. based on the total weight of the granules, such as 2% Wt. or less based on the total weight of the granules. A minor amount of liquid or residual moisture on the surface of the granules may improve the granule properties in respect of receiving dusting agents, e.g. talcum or preferably sorbitol. In the preferred embodiment the liquid is water, but it can also be e.g. a vegetable oil. It is also possible to store the extruded granules in the liquid and subsequently prepare the granules for further processing, e.g. by removal of liquid.

In order to control the properties of the final product it is preferred that the method comprises a further step of classifying the extruded granules in relation to diameter. The granules may be classified by means of one or more sieves and divided into fractions depending on size. Granules having average diameters of more the about 3 mm is preferably removed from the mixture and optionally re-circulated to the gum composition feed to the extruder in step a).

It is possible to use the gum granules without any treatment, but preferably the method according to the invention comprises a further step of mixing the extruded granules with one or more ingredients selected from the group comprising flavours, sweeteners, intense sweeteners, colouring agents, pharmaceutical agents, fillers, and tabletting aids. In particular it is preferred to mix the extruded granules with a sweetener like sorbitol. Sorbitol has been found to function as an anti-agglomerating product and furthermore improves the taste of the final chewing gum product.

As previously mentioned the granules according to the invention have proven to be very suitable for compressed chewing gum products.

Preferably the tablets comprises gum base in the range from 28 to 70% Wt., preferably in the range from 30 to 45% Wt., and suitably in the range from 31 to 39% Wt., based on the total weight of the tablets. As indicated earlier the high level of gum base in the granules seems to improve the properties of the chewing gum in the initial phase of chewing. The compressed tablets may, beside the granules according to the invention, comprise sweetener, flavour, filler and/or other ingredients known within the art. Preferably the tablets are coated with a conventional chewing gum coating.

Although the gum granules are useable without a coating it is for some embodiments preferred to coat the granules, such as with a coating comprising one or more coatings or ingredients selected from the groups comprising magnesium stearate, cornstarch, sugar compounds, polyols, cellulose ethers such as hydroxypropylmethylcellulose (e.g. as film coating), acrylic polymers and copolymers, sugarless/sugarfree coatings, or waxes. The coating can be provided in any known manner within the art of coating chewing gum. The coating may serve to act as a tabletting aid or to protect the chewing gum composition core and retain moisture in the chewing gum during storing. The coating can also facilitate the filling of granules into tablet pressing forms.

Moreover, the present invention also relates to use of the method for production of a chewing gum product, preferably compressed gum tablets.

The invention also relates to a chewing gum product obtained by the methods described above.

Moreover, the invention relates to a chewing gum product comprising compressed gum composition granules wherein a first fraction of the gum composition granules has a first average diameter, and at least a second fraction of the gum composition granules has a second average diameter larger than said first average diameter. More specific it is preferred that the first average diameter is in the range from 0.1 to 0.95 mm, preferably from 0.25 to 0.9 mm, suitably 0.3 to 0.5 mm, and the second average diameter is in the range from 0.6 to 1.9 mm, preferably from 0.8 to 1.4 mm, suitably in the range 0.9 to 1.3 mm. Such chewing gum products have shown good properties with regard to texture and cohesion during the initial phase of chewing. Naturally the chewing gum product may comprise three, four or more fractions of gum granules with different average diameters in order to improve properties. Ranges, which may be preferred for gum granules with three different fractions of average diameters can be average diameters in a first range of 0.1-0.7 mm, suitably 0.2-0.6 mm, average diameters in a second range of 0.8-1.5 mm, suitably 0.9-1.4 mm, and averages diameter in a third range of 1.6-2.5 mm, suitably 1.7-2.4 mm.

In preferred embodiments the chewing gum product further comprises granules of flavour and/or sweetener, and optionally other ingredients. The chewing gum product can preferably be produced according to the methods described above.

In a further aspect the invention also relates to a chewing gum granulating system for use in producing compressed chewing gum products, and comprising an extruder with a feeding device for feeding gum composition to the extruder, said extruder communicating with a liquid filled granulating chamber via a die device having a plurality of openings, wherein the die device has a first plurality of openings with a first size and at least a second plurality of openings with a second size larger than said first size.

The system provides gum composition granules with sizes in at least two fractions, thereby improving the distribution of high-tack granules and counter-acting segregation during tabletting of the mixture of granules, sweetener and/or flavour and optional other additives supplied to the tabletting machine. Such segregation could lead to extended low-tack areas within the tablet. By using granules in several sizes the compacting of the gum composition in the tabletting machine is also facilitated. The granules provide distributed high-tack areas within the tablet, and a result is tablets with improved cohesion and texture.

Although the openings of the die device may have cross-sections of any desired shape, e.g. circular, oval, square etc., it is preferred that the die device comprises openings with substantially circular cross-section and diameters in the range of 0.1 to 3.1 mm. A first set of openings can e.g. have a first diameter in the range of 0.07 to 0.7 mm, preferably in the range of 0.15 to 0.6 mm, and suitably in the range of 0.2 to 0.5 mm. A second set of openings can have a second diameter larger than said first diameter. The second diameter is conveniently in the range of 0.4 to 2.1 mm, preferably in the range of 0.7 to 1.9 mm, and suitably in the range of 0.7 to 1.4 mm.

As it will be understood by the person skilled in the art, the invention also includes die devices having openings with three, four or more different sizes. Optional preferred ranges for diameters in a die device comprising openings with substantially circular cross-section and three different diameters can be a first diameter conveniently within the range of 0.05 to 0.7 mm and preferably in the range of 0.1 to 0.6 mm, suitably in the range of 0.15 to 0.5 mm, a second diameter conveniently in the range of 0.4 to, 1.2 mm, preferably in the range of 0.6 to 1.1 mm, suitably in the range of 0.7 to 1.1 mm, and a third diameter conveniently in the range of 0.9 to 2.0 mm, preferably in the range of 1.1 to 1.9 mm, suitably in the range of 1.2 to 1.8 mm. By use of such a die device a very dense tablet with good cohesion and texture can be obtained.

Preferably the chewing gum granulating system further comprises a drying device adding powder sweetener to the granules in a final drying step. The drying device can be a conventional centrifugal dryer or another suitable dryer e.g. a fluid bed dryer. The drying device can, for example, include a mixer. The powder sweetener is preferably sorbitol, which is mixed to the dried or partially dried granules. Minor amounts of residual moisture on the surface of the granules, e.g. 2% Wt. based on the total weight of the granules, may contribute to the adherence of the sorbitol powder to the surface of the granules. It is possible to use a conventional anti-agglomerating agent as e.g. talcum, but sorbitol powder can function as an anti-agglomerating agent, and at the same time serves as sweetener. Although sorbitol is found to be most suitable, other bulk sweeteners based on polyols may also be suitable, e.g. mannitol, xylitol, hexa-resorcinol, maltitol, isomaltol, erythriol, and lactitol.

In a preferred embodiment the chewing gum granulating system according to the invention further comprises one or more sieves adapted for removing granules with an average diameter above 3 mm, preferably above 2.55 mm. The removal of larger granules improves a subsequent tabletting process.

The tabletting machine used in the system can be of any conventional kind suitable for tabletting gum composition granules optionally mixed with flavour, sweetener or other additives into tablets of chewing gum.

According to the invention it is preferred that at least the extruder and/or the die device comprises means for controlling the temperature of the gum composition. The means for controlling temperature can be cooling or heating devices, and may serve to facilitate the flow of gum composition through the extruder and the die device. In an embodiment the extruder comprises delivering means for delivering sweetener and/or flavour to the gum composition in the extruder.

Non-limiting examples and embodiments of the system and the method according to the invention are in the following described in further detail with reference to the highly schematic drawings.

BRIEF DESCRIPTION OF THE DRAWINGS

Examples of the invention will in the following be explained in further details with reference to the very schematical drawings, in which FIG. 1 is a diagram illustrating a chewing gum granulating system, and FIG. 2 illustrates in an end view a die plate with rotary knives for cutting extruded granules.

DETAILED DESCRIPTION OF THE INVENTION

As used herein the term "gum base" refers in general to a commercially available gum base suitably for production of chewing gum. Such gum bases normally comprise natural and/or synthetic resins and optionally other ingredients.

The term "gum composition" as used herein may be a gum base as defined above, a gum base comprising one or more ingredients (e.g. sweetener, flavour, colouring agents, fillers etc.), or it may be a chewing gum composition as defined below.

The term "chewing gum composition" is the final formulation, which constitutes at least a part of the compressed chewing gum product ready for use by the consumer. A chewing gum composition may comprise sweetener and/or flavour and optionally other ingredients like colouring agents, pharmaceutical agents, enzymes, humectants, flavour enhancers, anticaking agents etc.

Furthermore "chewing gum product" denotes a ready for use chewing gum, e.g. comprising compressed granules of chewing gum composition possibly mixed with sweeteners, flavour or other ingredients and optionally coated.

The term "gum granules" or "granules" as used herein refers to particulate material of gum composition having average diameters below about 3 mm, such as in the range of 0.1 to 2.5 mm.

The term "average diameter" as used herein is defined as the diameter of a sphere having the same volume as the granule. Although the granules produced according to the present invention mostly are substantially spherically, variations in shape may occur, and according to the definition granules having the same volume also have the same average diameter.

Unless otherwise indicated all percentages are weight % (denoted % Wt.).

The expression "initial phase of chewing" refers to the situation from the time where the consumer introduces the chewing gum into the mouth and begins chewing and up to the first 60 seconds of chewing. The behaviour of the chewing gum in these initial seconds of chewing is very important for the all-over impression of the chewing gum, where a cohesive smooth gum will give the consumer the best feeling.

In FIG. 1 a chewing gum granulating system generally denoted 1 comprises at least an extruder 2 and a granulating apparatus 3 having a chamber 4 with a die plate 5. The extruder 2 is equipped with a first inlet with a hopper 6 for feeding gum composition to the extruder 2. In the illustrated embodiment the extruder 2 is further equipped with additive feeding devices 7 and 8 connected to further inlets for feeding additives to the gum composition in the extruder 2. The additive feeding device 7 can e.g. be used for adding sweetener, and the additive feeding device 8 can e.g. be used for adding flavour.

The extruder 2 delivers pressurized gum composition to the inlet side of die plate 5 via a flow connection between an outlet on the extruder and an inlet of the granulating apparatus. The flow connection is provided with a valve 9, which in one position provides unrestricted passage from the extruder to the die plate, and in another position connect the extruder outlet with a drain pipe 10, which either leads to a receptacle 111 for discharged gum composition or to a recycling pipe 12 by which the gum composition can be recycled to hopper 6.

The extruder 2 can be a single or double screw extruder provided with a drive motor 13, preferably an electric motor with settable speed, or a hydraulic motor. In another embodiment of the extruder feeding devices 7, 8 have been omitted, and hopper 6 can then be supplied with pre-mixed gum composition of any desired type. The extruder has one or more heating devices 14 which can be included in the barrel of the extruder or can be associated with the screw. The heating device or devices can e.g. be of electrical heater type or heat exchanger type where the latter can be supplied with heating fluid such as hot water or hot oil. The die plate can also be provided with a heating device, which typically is of the type of internal channels in the plate, and a supply of hot heating liquid feeding the internal channels with the required amount of heat.

The granulating chamber 4 has an inlet 15 for cooling liquid and an outlet 16 for a slurry of suspended granules and cooling liquid. The cooling liquid is supplied by a pump 17 via an inlet pipe 18, and the pump can be fed with fresh cooling liquid from a source 19 or it can be supplied with re-circulated cooling liquid from a strainer unit 20 via a pipe 21. A control valve 22 regulates the degree of re-circulation. The system can also have an intercooler for cooling re-circulated cooling liquid.

Cutting means, such as rotating knives 23, act on the outlet side of the die plate. The gum composition extruded through openings in the die plate is cut into granules by the cutting means. The cutting means can be reciprocating knives, but is preferably embodied as rotating knives 23 mounted at the end of a drive axle 24 which is driven by a motor 25, such as an electric motor or a hydraulic drive motor. The motor 25 preferably has settable speed.

The die plate is exchangeable so that several different die plates with different configuration of the openings can be used in the same granulating apparatus. The actual die plate configuration is chosen according to the desired size of granules. It is possible to use a die plate with a plurality of uniformly sized openings in order to produce a batch of uniformly sized gum granules. Then another batch of differently sized granules can be produced by making another run using a different die plate configuration. It is, however, preferred to use a die plate provided with differently sized openings so that granules of different sizes can be simultaneously produced in the same run. Gum compositions comprising e.g. 55% gum base can also be extruded through the die plate with differently sized openings.

FIG. 2 depicts an example of such a die plate 5 where an outer row of openings 26 are larger than an inner row of openings 27. The openings can be provided in any desired configuration of sizes and patterns.

An outlet pipe 28 connects outlet 16 with a dryer device in the form of strainer unit 20, in which the granules are separated from the cooling liquid. The dryer device can be of any commercially available type. Spent cooling liquid can be drained off to drain 29 or be re-circulated via pipe 21. The dryer can also be associated with a mixer 30 wherein the granules are mixed with e.g. anti-agglomerating agent, sweetener, flavour, tabletting aids etc, to form a mixture. The system can optionally include a classifying unit 31 with one or more sieves. The granules can be stored temporarily in a storage 32. Granules are either directly after straining and possible dusting or coating or after a possible intermediate storage and/or mixing with granules of different sizes or types fed to a tablet pressing machine 33 in which the granules are included in compressed gum tablets.

The size of granules are controlled by several factors such as opening sizes, the gum composition, gum temperature at and pressure drop across the die plate. Due to an interaction between the pressurized gum composition, temperature and friction in the openings of the die device, the average diameter of the produced granules are normally larger than the diameters of the openings in the die device. The relation between the diameters of the openings in the die device and the average diameters of granules produced from a specific gum composition may be determined by the skilled person on basis of routine experiments.

The gum base used in the method according to the invention may be any water-insoluble gum base well known in the art. Illustrative examples of suitable polymers for gum base include, natural and synthetic elastomers, resins and rubbers. For example, suitable polymers include substances of vegetable origin such as rubber latex solids, chicle, gelutong, nispero, rosidinha, pendare, perillo, niger gutta, tunu, gutta percha, and crown gum. Synthetic elastomers such as butadiene-styrene copolymers, isobutylene-isoprene copolymers, polyethylene, polyisobutylene, petroleum wax and polyvinylacetate and mixtures thereof are also useful in gum base.

Gum base may also contain elastomer solvents to aid in softening the gum base. Such materials may include methyl, glycerol or pentaerythritol esters of rosins; methyl, glycerol or pentaerythritol esters of modified rosins, such as hydrogenated, dimerized or polymerized rosins; mixtures thereof and the like. Examples of such materials include pentaerythritol esters of partially hydrogenated wood rosin, pentaerythritol esters of wood rosin, glycerol esters of partially dimerized rosin, glycerol esters of polymerized rosin, glycerol esters of tall oil rosin, glycerol esters of wood rosin or partially hydrogenated wood rosin, partially hydrogenated metal esters of rosin such as polymers of alpha.-pinene or beta.-pinene, terpene resins including polyterpene, mixtures thereof and the like.

A variety of traditional ingredients such as plasticizers or softeners, such as lanolin, stearic acid, sodium stearate, potassium stearate, glyceryl, triacetate, glycerine, natural waxes, petroleum waxes such as polyurethane waxes, paraffin waxes and microcrystalline waxes, may also be incorporated into a gum base to obtain a variety of desirable textures and consistency properties.

Other conventional ingredients that may be present in a gum base include a hydrophilic-type detackifier that will absorb saliva and become slippery. The hydrophilic type detackifier should preferably be incompatible with the elastomer and solvent for the elastomer, and may include such materials as polyvinyl acetate, polyvinyl butyl ether, copolymers of vinyl esters and vinyl ethers, mixtures thereof and the like.

Gum base may also include hard waxes that serve as lubricants. Examples of such hard waxes include candelilla wax, paraffin wax, carnauba, wax, ozokerite, oricuri, microcrystalline wax and the like.

Gum base may also include a softening agent and/or lubricant that may comprise one or more hydrogenated vegetable or animal fats preferably having a high melting point above about 22° C.

Gum base may also include an emulsifier to impart hydrophilic properties to the gum base. The emulsifier causes saliva to be absorbed into the gum base, thereby making the gum base slippery. Examples of such emulsifiers may include glyceryl monostearate, phosphatides such as lecithin and sephalin, mixtures thereof and the like.

The gum base may also include particles of chalk or the like as a bulking agent and/or texturizer. Examples of such texturizing agents or inert fillers suitable for use in gum base include, calcium carbonate, aluminum hydroxide, alumina, magnesium carbonate, talc, aluminum silicates, mixtures thereof and the like.

Such gum bases are well known in the art, and may be modified to provide a variety of consistency, texture and other properties to the chewing gum product.

Sweeteners can e.g. be selected among bulk sweeteners such as sugar sweeteners, less or non-sweet sugars or polysaccharides, non-sugar sweeteners, such as the polyols isomalt, sorbitol, sorbitol syrup, mannitol, xylitol, hexa-resorcinol, maltitol, isomaltol, erythriol, lactitol, xylose, tagatose and hydrogenated starch hydrolysates (maltitol syrup); artificial high potent sweeteners or intense sweeteners such as the dipeptides aspartame, neotame and alitame; N-sulfonylamides such as saccharin including the salts thereof and acesulfam including the salts thereof; or any combination thereof.

The flavouring agents suitably for use in the present invention can e.g. be a natural, natural-identical, or artificial flavouring substance, or a mixture thereof. At room temperature the flavouring agent may be in solid state as a dry powder or flavour granules, or in liquid state as an essence or oil, or mixtures thereof. The dry flavours may include standard powder (i.e. a liquid flavouring agent mixed homogeneously with a powder carrier material), spray dried powder whereby the flavouring agent is coated by a protective layer i.e. microencapsulated), freeze dried powder, or flavour granules. Flavour granules differ from the powders by substantially larger particle sizes (approximately 500-1500 µm) compared to powders (approximately 10-150 µm). Optionally these flavour granules may also comprise a colouring agent and thereby provide a visual effect in the product. Furthermore, seeds derived from berries and fruits may also be included as dry flavouring agents.

The liquid flavouring agents may include essences also known as extracts which are concentrated flavouring agents produced either by reducing a liquid until it is a syrup or by dissolving a spice or flavouring oil in alcohol, and essential oils also known as flavouring oils which are highly concentrated essences.

Preferably, the solid and the liquid flavouring agents are encapsulated in a protective matrix protecting them from heat and moisture and thereby reducing the oxidation and evaporation of the liquid flavouring agent. As a result the stability of the flavouring agent is markedly improved extending the shelf life of the product. These encapsulating processes are well known to those skilled in the art.

A variety of one or more flavouring agents may be used. Flavouring agents suitable for use in the present invention include natural, natural-identical, and/or artificial flavouring substance, or mixtures thereof, in their solid and/or in their liquid state.

The person skilled in the art will recognize that natural and artificial flavouring agents may be combined in any sensorially acceptable blends.

During extrusion of the gum composition the differential pressure between the gum composition in the extruder and the gum composition in the liquid filled chamber, i.e. over the die device is suitably above 10 bar, preferably above 18 bar, such as in the range of 25 to 90 bar. The temperature of the gum composition in the extruder is preferably in the range of 40 to 125° C., suitably in the range 50 to 115° C. The temperature of the die device is preferably in the range of 60 to 190° C., suitably in the range 80 to 180° C. The temperature of the liquid in the liquid filled chamber is conveniently in the range of 8 to 25° C. The optimum for the pressures and temperatures in the method according to the invention may, however, be determined by the skilled person as a matter of routine. The optimum values for specific gum compositions, varies of course, depending on the composition.

The tablet pressing machine may be any conventional tablet pressing machine capable of pressing tablets comprising gum granules. The final tablets preferably have a weight in the range of 0.5 to 3.5 g, conveniently in the range of 1.0 to 2.5 g.

EXAMPLES

Example 1

A commercially available gum base based on synthetic resins (DANfree T Firm 1, available from Gumlink A/S, Denmark) was used to produce chewing gum products according to the invention.

Gum base in the form of pellets was manually mixed with menthol flavour crystals (MENTHOL BP/USP, available from SHARP MENTHOL INDIA LIMITED, India) aspartame powder (Aspartame, available from ZHUNYONGXIN-RONG BIOCHEMICAL PRODUCTS CO., LDT, China), and acesulfame-K (Sunett, particle size A, available from Nutrinova GmbH, Germany) to form a gum composition as shown in table 1.

TABLE 1

Gum composition

| Ingredient | Amount % Wt. |
| --- | --- |
| gum base | 89.24 |
| menthol flavour crystals | 6.08 |
| aspartame powder | 0.23 |
| acesulfame K | 0.23 |
| mint oil* | 4.22 |

*mint oil was added in the extruder

The gum composition was feed to an extruder (Leistrits ZSE/BL 360 kw 104, available from GALA GmbH, Germany) and mint oil (PD3-68H, type 1100102, available from A.M.TODD COMPANY, U.S.A) was added in an amount of 4.22% Wt. and mixed to the gum composition in the extruder. The resulting gum composition was extruded to a granulator comprising a die plate and liquid filled chamber (A5 PAC 6, available from GALA GmbH, Germany) connected to a water system comprising water supply for the granulator and centrifugal dryer (TWS 20, available from GALA GmbH, Germany). The granulator produced gum granules according to examples 2-5 given below.

Example 2

The composition of table 1 was feed to the extruder with a feed rate of 250 kg/h and screw speed of 247 rpm. The minimum temperature in the extruder was 44° C. and the maximum temperature was 109° C. The pressure difference was 71 bar. The composition was extruded through a die plate having a temperature of 177° C. and 336 holes with diameter 0.36 mm. In the granulator chamber the extruded composition was cut to granules by a cutter with 8 blades and cutter speed 1999 rpm. The granules were cooled and transported to the centrifugal dryer in water with temperature 19° C. and flow 22 m³/h. The average cooling and transport time in water was approx. 2 seconds. The granule rate was 250 kg/h and the average diameter of the obtained granules was 1.24 mm.

Example 3

The composition of table 1 was feed to the extruder with a feed rate of 200 kg/h and screw speed of 198 rpm. The minimum temperature in the extruder was 44° C. and the maximum temperature was 108° C. The pressure difference was 72 bar. The composition was extruded through a die plate having a temperature of 149° C. and 192 holes with diameter 0.50 mm. In the granulator chamber the extruded composition were cut 30 to granules by a cutter with 8 blades and cutter speed 2200. The granules were cooled and transported to the centrifugal dryer in water with temperature 180 C and flow 23 m³/h. The average cooling and transport time in water was approx. 2 seconds. The granule rate was 200 kg/h and the average diameter of the obtained granules was 1.97 mm.

Example 4

The composition of table 1 was feed to the extruder with a feed rate of 250 kg/h and screw speed of 139 rpm. The minimum temperature in the extruder was 42° C. and the maximum temperature was 109° C. The pressure difference was 52 bar. The composition was extruded through a die plate having a temperature of 119° C. and 24 holes with diameter 1.00 mm. In the granulator chamber the extruded composition were cut to granules by a cutter with 8 blades and cutter speed 2800. The granules were cooled and transported to the centrifugal dryer in water with temperature 18° C. and flow 23 m³/h. The average cooling and transport time in water was approx. 2 seconds. The granule rate was 250 kg/h and the average diameter of the obtained granules was 2.48 mm.

Example 5

The composition of table 1 was feed to the extruder with a feed rate of 240 kg/h and screw speed of 139 rpm. The minimum temperature in the extruder was 38° C. and the maximum temperature was 110° C. The pressure difference was 39 bar. The composition was extruded through a die plate having a temperature of 120° C. and 3 holes with diameter 3.20 mm. In the granulator chamber the extruded composition were cut to granules by a cutter with 8 blades and cutter speed 999. The granules were cooled and transported to the centrifugal dryer in water with temperature 17° C. and flow 23 m³/h. The average cooling and transport time in water was approx. 12 seconds. The granule rate was 240 kg/h and the average diameter of the obtained granules was 6.45 mm.

Example 6

The gum composition granules from example 2, 3 and 4 where further processed. The gum composition granules from example 5 were considered having too large an average diameter to be suitable for a tablet pressing process. The larger granules in example 5 also had to remain a substantially longer time in the water to be sufficiently cooled (approx. 12 seconds compared to approx 2 seconds for example 2-4).

The gum composition granules from example 2, 3 and 4 were individually mixed in a standard mixer with flavour (menthol flavour crystals) and sweeteners (intense sweeteners: aspartame powder and acesulfame K; bulk sweetener: sorbitol, available from CERESTAR Scandinavia A/S, Denmark) as shown in table 2.

TABLE 2

| Mixture for pressed tablets | |
| --- | --- |
| Ingredient | % Wt. |
| gum composition granules | 39.48 |
| aspartame powder | 0.13 |
| acesulfame K powder | 0.13 |
| sorbitol powder | 58.04 |
| menthol flavour crystals | 2.22 |

Before pressing the mixtures passed a standard horizontal vibration sieve removing particles larger than 2.6 mm. The mixture was subsequently lead to a standard tablet pressing machine comprising dosing apparatus (P 3200 C, available from Fette GmbH, Germany) and pressed into compressed chewing gum tablets. The filling depth was 7.5 mm and the diameter 7.0 mm. The tablets were pre-compressed to 5.0 mm and then main compressed to 3.2 mm using a pressing pressure of 33.0-33.6 kN. There were 61 punches on the rotes, and the rotor speed used was 11 rpm. The individual compressed tablets had a weight of approx. 1.5 g.

A test group assessed the chewing gum tablets manufactured from gum granules from example 2, 3 and 4 respectively. The products from example 2 and 3 were assessed to have excellent properties with regard to cohesion and texture during the initial phase of chewing, while the product from example 4 was slightly inferior. All of the assessed tablets demonstrated good properties with regard to duration of taste.

Example 7

An alternative mixture of gum granules from example 2 and 3 with flavour and sweetener as shown in 25 table 3 was prepared.

TABLE 3

| Alternative mixture for pressed tablets | |
| --- | --- |
| Ingredient | % Wt. |
| gum granules, example 2 | 23.57 |
| gum granules, example 3 | 15.91 |
| aspartame powder | 0.13 |
| acesulfame K powder | 0.13 |
| sorbitol powder | 58.04 |
| menthol flavour crystals | 2.22 |

The alternative mixture of gum granules Was processed and pressed into tablets as described in example 6.

The obtained tablets had a good tight texture and provided a very satisfactory cohesion during the initial phase of chewing.

What is claimed is:

1. A method for producing a final product of chewing gum tablets, the method comprising:
producing an intermediate product of chewing gum granules for use in compressed chewing gum tablets, wherein the method comprises at least the steps of:
a) feeding a gum composition including at least gum base into an extruder;
b) pressurizing the gum composition in the extruder;
c) extruding the gum composition through a die plate;
d) cutting the extruded gum composition into the intermediate product of chewing gum granules in a liquid filled chamber, said gum granules including at least gum base in the range of 86 to 99% by Wt. based on the total weight of the granules, wherein the cut gum granules include at least one taste ingredient in an amount of at least 0.1% by Wt. based on the total weight of the granules, and wherein the cut gum granules have an average diameter in a range from 0.3 to 2.1 mm,
producing the final product of chewing gum tablets by further performing the steps of:
mixing the extruded granules with one or more ingredients selected from the group consisting of flavours, sweeteners, intense sweeteners, colouring agents, fillers, and tabletting aids; and
compressing the mixture to produce the final product of chewing gum tablets having gum base in the range from 28-70% by Wt. based on the total weight of the tablets.

2. A method according to claim 1, wherein the gum granules include gum base in the range of 91 to 99% by Wt. based on the total weight of the granules.

3. A method according to claim 1, wherein the taste ingredient is a non-bulk sweetener.

4. A method according to claim 1, wherein the taste ingredient is a flavour.

5. A method according to claim 4, wherein during step b) the gum composition is mixed with flavour.

6. A method according to claim 1, wherein the granules comprise flavour in the range of 1 to 10% by Wt. based on the total weight of the granules.

7. A method according to claim 1, wherein the granules comprise flavour in the range of 2 to 5% by Wt. based on the total weight of the granules.

8. A method according to claim 1, wherein a fraction of the cut granules has an average diameter is in a range from 0.25 to 0.9 mm.

9. A method according to claim 1, wherein a fraction of the cut granules has an average diameter in the range from 0.8 to 1.4 mm.

10. A method according to claim 1, wherein the granules are included in compressed tablets, which tablets comprise gum base in the range from 28 to 70% by Wt. based on the total weight of the tablets.

11. A method according to claim 10, wherein the tablets comprise gum base in the range from 30 to 45% by Wt. based on the total weight of the tablets.

12. A method according to claim 10, wherein the tablets comprise gum base in the range from 31 to 39% by Wt. based on the total weight of the tablets.

* * * * *